United States Patent [19]
Ernster

[11] Patent Number: 5,336,933
[45] Date of Patent: Aug. 9, 1994

[54] FLUID-AUGMENTED FREE-VORTEX POWER GENERATING APPARATUS

[75] Inventor: Melvin J. Ernster, Sun Valley, Calif.

[73] Assignee: Bru-Mel Corporation, Los Angeles, Calif.

[21] Appl. No.: 834,222

[22] PCT Filed: Jul. 16, 1990

[86] PCT No.: PCT/US90/03949
§ 371 Date: Feb. 10, 1992
§ 102(e) Date: Feb. 10, 1992

[51] Int. Cl.$^5$ .............................. F03D 3/00
[52] U.S. Cl. .......................... 290/55; 290/44;
415/2.1; 415/4.1; 415/4.2; 415/4.4; 415/905;
415/907
[58] Field of Search .............. 290/44, 55; 415/2.1,
415/4.1, 4.2, 4.4, 905, 907

[56] References Cited

U.S. PATENT DOCUMENTS 4,070,131  1/1978  Yen .......................... 415/4.4
4,236,866  12/1980  Zapata Martinez .......... 415/4.4

FOREIGN PATENT DOCUMENTS 2305608  10/1976  France .................... 415/4.1
1866  2/1992  World Int. Prop. O. ........ 415/4.2

*Primary Examiner*—Marc S. Hoff
*Assistant Examiner*—Robert Lloyd Hoover
*Attorney, Agent, or Firm*—Albert O. Cota

[57] ABSTRACT

A fluid-augmented free-vortex power generating apparatus (10) that is driven by either prevailing winds or water and which has a turbine (24) that includes a number of axially extending cup like sails (20) mounted on a freely rotating hub (22). A fluid mover (28) in the form of a fan or blower as would be used when the fluid medium is air or a water pump when the fluid medium is water, tangentially directs a flow of fluid under high velocity onto the turbine sails inducing rotation and creating an unconfined vortex around the apparatus (10). A power generator produces electrical energy from the rotation of the rotor which revolves due to the combined impingement of the fluid mover (28) and intensified regenerated circular fluid movement created by the artificially created unconfined vortex.

10 Claims, 2 Drawing Sheets

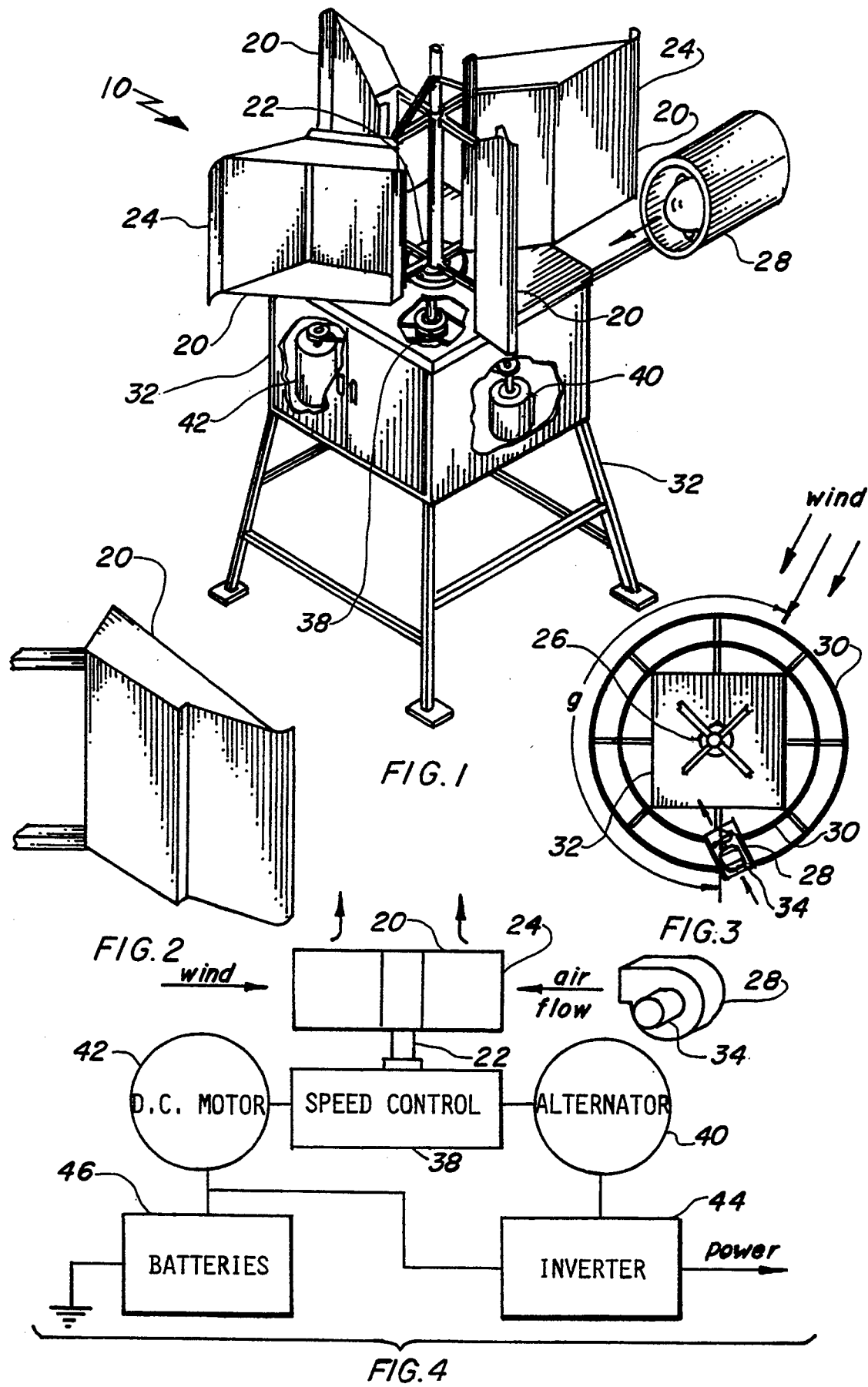

FLUID-AUGMENTED FREE-VORTEX POWER GENERATING APPARATUS

RELATED APPLICATIONS

The application was originally filed as PCT/US90/03949 on Jul. 16, 1990, which was published by WIPO as 92/01866 on Feb. 6, 1992.

TECHNICAL FIELD

The invention pertains to the general field of power generating systems and more particularly to a fluid driven apparatus that rotates a power producing generator using an artificially-created unconfined vortex in combination with the prevailing fluid flow.

BACKGROUND ART

The use of windmills and water wheels to drive a generator that, in turn, produces electrical power is well known in the art. The efficiency with which a windmill or water wheel converts fluid power into usable shaft power is primarily dependent upon the design of the vane and the mechanism used to support the vane.

Two basic windmill designs are presently in use: those having horizontal axis of rotation and those having vertical axis of rotation. The windmills with a vertical axis rotor have a major advantage over horizontal axis rotors in that they do not have to be turned into the wind as the direction of the wind changes. Thus, the design parameters for vertical axis windmills are less stringent because the forces that apply stress on the vanes or blades, bearings and other moving components are eliminated.

The efficiency of a vertical axis windmill is dependent upon the efficiency of its vanes. The net efficiency is the difference between the power extracted from the wind when the vane is moving with the wind, less the drag produced when the vane is moving against the wind. The prior art vertical drag windmills generally have relatively high starting torques. However, they also have relatively low power outputs per given rotor size and weight.

A search of the prior art did not disclose any patents that read directly on the claims of the instant invention however, the following U.S. patents were considered related:

| U.S. PAT. NO. | INVENTOR | ISSUED |
| --- | --- | --- |
| 4,684,817 | Goldwater | 4 August 1987 |
| 4,545,729 | Storm | 8 October 1985 |
| 4,530,642 | Yang | 23 July 1985 |
| 4,457,669 | Corry | 3 July 1984 |

The Goldwater patent discloses a windmill that rotates in a horizontal plane about a vertical axis. The design includes essentially radial vanes where each vane is effectively a one way valve respective to air flow and each enhances the beneficial actions of the others. The vanes in operation, effectively simulate a sailing vessel navigating a circular course in wind of constant direction. Each of the vanes includes a framework which supports a grid that, in turn, is the supporting means for a plurality of pivotally connected, vertically aligned and overlapping light weight flexible sails. The sails are automatically rotated about the pivotal connection by the force of the wind into positions promoting the revolution of the windmill.

The Storm patent discloses a vertical axis of rotation wind turbine that utilizes sail elements. The elements include flexible sails which may be furled and unfurled in response to the speed of the wind, and which utilize a weight system for varying the area of the sail elements exposed to the wind.

The Yang patent discloses an improved windmill mechanism for adjusting the position of a wind responsive assembly in relation to the wind. The mechanism consists of a fabric sail mounted on the end of an arm which extends from a power output shaft. A torque sensor is disposed on the arm to sense the torque contribution through the arm to the power output shaft in response to wind acting upon the fabric sail. The position of the fabric sail is adjusted on the arm by means of a control processor which controls a trim motor and a magnetic brake.

The Corry patent discloses a sail-type windmill that provides high torque without limitations to size. Three sails are mounted to a frame for rotation about an axis generally parallel to the planes of the sails. The sails are flexible and sheets are provided for mounting the sails. Roller reefing is provided for modifying the effective area each sail member presents to the wind, including a spring biased weight associated with each sail and a line extending from the weight for effecting take-up and let-out of the sail and the sheet in response to radial movement of the weight.

DISCLOSURE OF THE INVENTION

The principle of using a windmill or water wheel to harness the energy from the naturally occurring fluid flows such as from wind or water is centuries old. This approach has been improved over the years and in one form or the other has been and is still in constant use. With present technology about two thirds of the kinetic energy of the air mass moving over the surface of a rotor or blade is captured and an almost equal efficiency is achieved in converting the rotational force into usable electrical energy. This value is realized only under ideal conditions using the simple basic principle of fluid movement against an aerodynamic shaped blade equating an area equal to that of the frontal zone exposed to the shear loading of the fluid. This efficiency is found only on high speed propeller type blades under near ideal ambient conditions. Wind-mills with vertical axis rotors, such as the Savonius type achieve approximately one third of the above mentioned efficiency and conventional hemispheres and hemicylinders only about one ninth. Because of these very large machines or devices placed in areas with high winds have been required to economically generate usable electric power.

The primary object and basic novelty of this invention resides in an entirely new fundamental principle using a turbine that reacts in combination with both the prevailing wind or water flow and the fluid force produced by an auxiliary fluid mover, which consists of a blower when air is the fluid medium or a water pump when water is the fluid medium, to create an unbalanced force around and above the apparatus that induces an unconfined or free vortex flow. This artificially created vortex causes a partial vacuum to occur directly above the apparatus that causes an inward and upward spiral motion of the lower fluid followed by an outward and upward spiral fluid motion. This phenomena is formed artificially by auxiliary fluid impinging on the rotor blades or sails while pressure differentials, thus created, allow an intensified regenerative force of fluid to drive the blades in addition to the impingement of the auxiliary fluid flow provided by the fluid mover. This additional force produces over three times the power of a conventional wind machine as indicated in experimental testing. While the amount of energy absorbed by the rotor may vary according to the actual wind speed and prevailing ambient conditions, it is anticipated that up to a magnitude increase of five times the efficiency may be realized with optimum conditions and equipment.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment with the vortex fluid mover shown in the proper orientation but detached from the invention.

FIG. 2 is a partial isometric view of one of the blades or sails completely removed from the invention for clarity.

FIG. 3 is a plan view of the preferred embodiment with the fluid mover axially attached to the power generator frame.

FIG. 4 is a schematic block diagram illustrating a possible mode of electrical power generation from the rotation of the rotor.

FIG. 5 is a diagram of the fluid flow as seen from above In plan view.

BEST MODE FOR CARRYING OUT THE INVENTION

Figure 5:
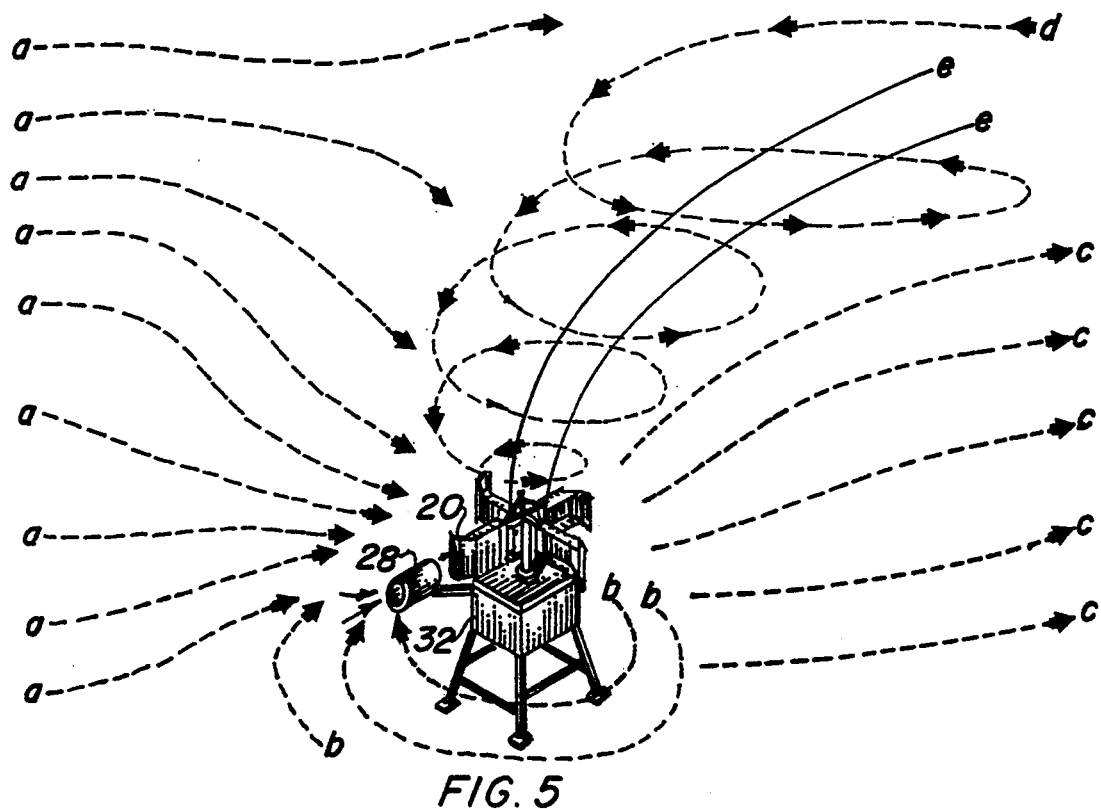
FIG. 5 is a partial isometric view of the preferred embodiment illustrating the fluid flow from the prevailing fluid flow and the unconfined vortex created artificially by the combined shape of the sail and the fluid impinging on the sail from the fluid mover.
Figure 6:
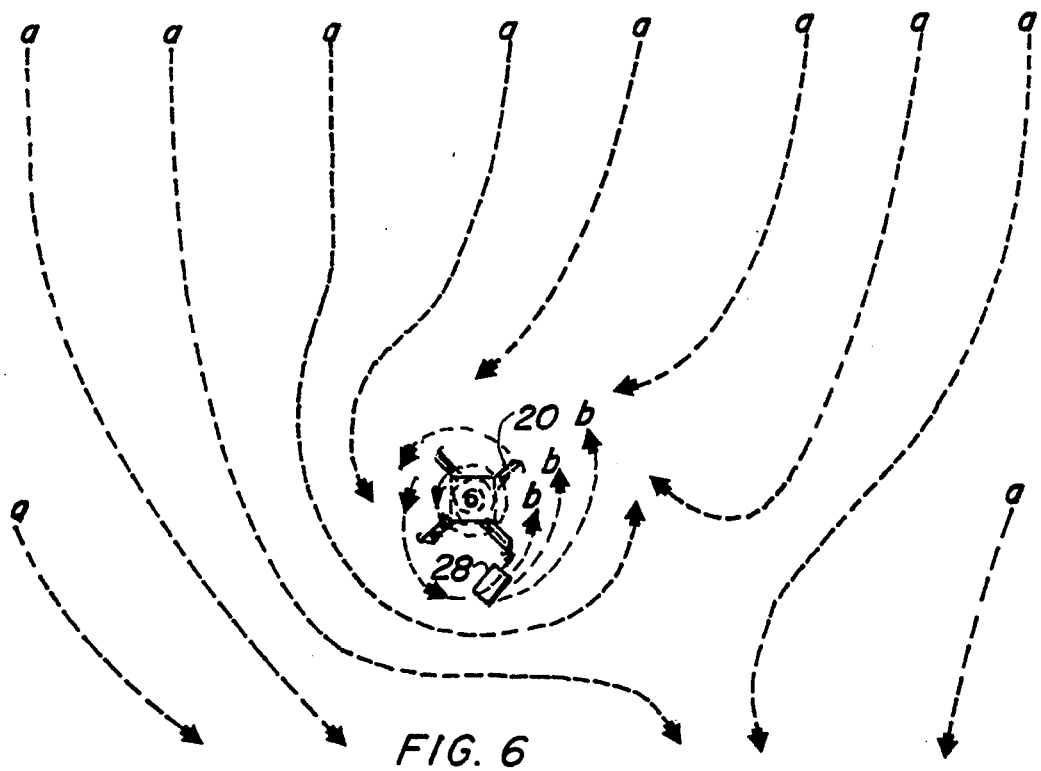

The best mode for carrying out the fluid-augmented free-vortex power generating apparatus 10 is presented in terms of a preferred embodiment. The preferred embodiment, as shown in FIGS. 1 through 6 is comprised of a plurality of aerodynamic shaped sails or blades 20 equally spaced around a hub 22 forming a turbine 24. The shape of the sail 20, as illustrated removed from the apparatus 10 in FIG. 2, not only forms a surface that is driven by the vertical flow of fluid around the rotor 24 causing rotation but assists in originating the unconfined vortex around the entire apparatus. The sail 20 of blade, as it is sometimes referred to, is composed of several aerodynamic surfaces including one surface that projects from a hub 26 in the axial center of the turbine 24 and one at an approximate right angle forming a scoop like segment. Each sail 20 is rigidly connected to the hub 26 in the center and rotates about the axis as shown in FIGS. 5 and 6. Any number of sails may be used with equal ease however, four individual sails on a single hub have been tested with satisfactory results. The sails 20 may be made of any material suitable for the application such as steel, aluminum, fiberglass, composition thermoplastics and the like. The hub 26 structurally unites the sails 20 and provides a beating surface to maintain the position of the turbine 24. Bearings are preferably provided to allow rotation with minimal frictional drag enabling the rotor to spin freely when rotated by the fluid flow. The shape of the sail 20 provides a cup like scoop that when reacting with directed fluid, creates the phenomena of a vortex.

A vortex excitation fluid mover 28 provides this basic rotation ultimately forming the vortex around and above the apparatus. The fluid mover 28 which consists of an air mover when air is the fluid medium and a water pump when water is the fluid medium may be of any type device that creates a pressure differential causing the surrounding fluid to flow. As an example, when air is the fluid medium centrifugal fan or blower impellers will cause the air to flow by the centrifugal force created by rotating the air column enclosed between the blades and the kinetic energy imparted to the air by virtue of the velocity. Axial flow fans that produce static pressure from the change in velocity passing through the impeller may also be used. Therefore, almost any fluid mover may be employed including an airfoil impeller, backward curved or inclined impeller, radial or a forward curved impeller in a scroll housing. The fluid mover 28 however, must develop and supply sufficient velocity pressure on the sails 20 to allow the turbine 24 to develop peripheral velocity that is at least two times the velocity of the prevailing fluid speed in order to create and maintain the desired vortex flow.

To optimize the system efficiency, the fluid mover 28 is preferably located on the leeward side at a angle from 181 to 270 degrees from the direction of the prevailing fluid flow, as measured from outside the vortex flow field, and in the direction of rotation. FIGS. 5 and 6 depict the phenomena that takes place when the turbine 24 is excited properly by the fluid mover 28. The fluid force is depicted in FIG. 6 approaching the apparatus in a linear relatively constant manner and as the turbine 24 is rotating faster than the prevailing ambient fluid speed, the fluid exhausted from the sails 20 creates a rotational flow in a spiral direction causing a partial vacuum to occur directly above the apparatus. Unlike conventional windmills and water wheels that rely on the momentum created by decelerations in the fluid traversing the blades. The invention now sees a regenerated circular air movement immediately 360 degrees around the turbine 24 that not only augments the velocity pressure from the fluid mover 28 but greatly increases the kinetic energy in the form of velocity pressure from the swirling fluid surrounding the turbine 24. FIG. 5 depicts this regenerative force in the form of energy from the prevailing fluid "a", circulating in a regenerative flow "b" leaving the flow field boundary with a diminution of velocity "c". The vortex effect is shown around "b" and directly above the turbine generally designed "d" and the vacuum or eye is shown by a line labeled "e".

In order to create and maintain the free or unconfined vortex and eliminate the possibility of the vortex moving away from the turbine and traveling outwardly, the fluid mover 28 must be repositioned to maintain the desired alignment of 181 to 270 degrees. This alignment may be accomplished in a number of ways, the simplest is depicted in FIG. 3 and consists of a ring 30 around the base 32 of the power generator. The ring 30 may be fabricated in any convenient manner as long as the required circumferential movement is accomplished. Anyone skilled in the art may accommodate the fluid mover 28 in this reposition and it may be as simple as the ring 30 or may be electronically sensed and moved by servo-motors. Indeed the principle of positioning the fluid mover 28 is not altered by the mechanics to obtain the end result.

It has also been found that it may be advantageous to utilize an auxiliary drive motor 34 to rotate the turbine to initially establish the unconfined vortex in some environmental conditions and to re-establish a new vortex if the critical point of the vortex is lost. While optimum operation does not require this device its use may be necessary in some extenuating circumstances.

As energy is fed into the vortex by the prevailing fluid flow, the amount depends on many factors such as fluid density, speed, surface shear and temperature near the ground. Further, the degree of instability in the lower plane all effect the size and energy concentration at the edge of the vortex eye.

Electrical power generation using the rotary motion of a wind or water driven disc is old and well known in the art. While the invention accomplishes the same basic task any system may be used with impunity. FIG. 4 indicates one such system developed specifically for this invention using a combination of components all individually well known in the art.

The motor to drive the vortex excitation fluid mover 28 is designated 34. A speed control system 38 consists primarily of belts, gears or the like, connected to the hub 26 of the turbine 24. The electrical generator is converted from the mechanical energy by a permanent magnet alternator 40 cascaded to a direct current motor generator 42. A solid state DC to AC inverter 44 provides AC power for the output of the device. The DC motor generator 42 may be used in lieu of the drive motor 34 where commercial line power is not available using storage batteries 46 to initiate or re-establish the unconfined vortex effect phenomena.

It has been found that even with system losses such as friction, motor winding losses, electrical system resistance, generating inefficiencies, drive slippage etc. the power produced, has been calculated with an efficiency of 1.8 which is well above the conventional 0.6 deemed to be worthwhile in prior art.

while the invention has been described in complete detail and pictorially shown in the accompanying drawings, it is not to be limited to such details, since many changes and modifications may be made in the invention without departing from the spirit and the scope thereof. For example, several sail designs may be used with equal success. Hence, it is described to cover any and all modifications and forms which may come within the language and scope of the appended claims.

I claim:

1. A fluid driven power generating apparatus comprising:
   (a) a turbine having a plurality of aerodynamic shaped sails,
   (b) a vortex excitation fluid mover tangentially directing a flow of fluid under elevated velocity and pressure onto the turbine sails inducing rotation thereof combined with naturally occurring fluid flow creating an unconfined vortex of fluid around the turbine, and
   (c) a power generator connected to the turbine producing energy from a rotational force developed by the vortical effect causing a partial vacuum to occur directly above said apparatus thus creating an intensified regenerated spiral fluid motion around said turbine, the kinetic energy of the fluid impinging directly on the sails rotating said turbine and generator.

2. The power generating apparatus as recited in claim 1 wherein said sails are comprised of several aerodynamic surfaces including one surface that projects from a hub in the axial center of said turbine and one at an approximate right angle that forms a scoop like segment.

3. The power generating apparatus as recited in claim 1 wherein said fluid mover is designed to develop and apply sufficient velocity pressure on said sails to allow said turbine to develop a peripheral velocity that is at least two times the velocity of the prevailing fluid speed.

4. The power generating apparatus as recited in claim 1 wherein the vortex excitation fluid mover is positioned on the leeward side at an angle from 181 to 270 degrees from the direction of the fluid as measured from outside the vortex flow field and in the direction of rotation.

5. The power generating apparatus as recited in claim 1 further comprising a means to reposition said fluid mover to allow the alignment of 181 to 270 degrees to be maintained.

6. The power generating apparatus as recited in claim 1 wherein said turbine reacts in combination with both the prevailing fluid flow and the fluid force produced by said fluid mover to create an unbalanced force around and above said apparatus that induces a free or unconfined vortex flow.

7. The power generating apparatus as recited in claim 6 wherein said unconfined vortex flow causes a partial vacuum to form directly above said apparatus that causes an inward and upward spiral motion of the lower fluid followed by an outward and upward spiral fluid motion.

8. The power generating apparatus as recited in claim 1 further comprising an auxiliary drive motor configured to rotate said turbine to initially establish the unconfined vortex or to re-establish a new vortex if the critical point of the vortex is lost.

9. A fluid driven power generating apparatus that utilizes wind as the fluid medium, said apparatus comprising:
   (a) a turbine having a plurality of aerodynamic shaped sails,
   (b) a vortex excitation air mover tangentially directing a flow of air under elevated velocity and pressure onto the turbine sails inducing rotation thereof combined with the naturally occurring prevailing wind creating an unconfined vortex of air around the turbine, and
   (c) a power generator connected to the turbine producing energy from a rotational force developed by the vortical effect causing a partial vacuum to occur directly above said apparatus thus creating an intensified regenerated spiraling air motion around said turbine, the kinetic energy of the air impinging directly on the sails rotating said turbine and generator.

10. A fluid driven power generating apparatus that utilizes water as the fluid medium, said apparatus comprising:
    (a) a turbine having a plurality of aerodynamic shaped sails,
    (b) a vortex excitation water pump tangentially directing a flow of water under elevated velocity and pressure onto the turbine sails inducing rotation thereof combined with the naturally occupying prevailing water currents creating an unconfined vortex of water around the turbine, and (c) a power generator connected to the turbine producing energy from a rotational force developed by the vortical effect causing a partial vacuum to occur directly above said apparatus thus creating an intensified regenerated spiraling water motion around said turbine, the kinetic energy of the water impinging directly on the sails rotating said generator.

* * * * *